Dec. 26, 1939.   H. B. BERNAY   2,184,332
PRUNING IMPLEMENT
Filed April 27, 1937   5 Sheets-Sheet 2
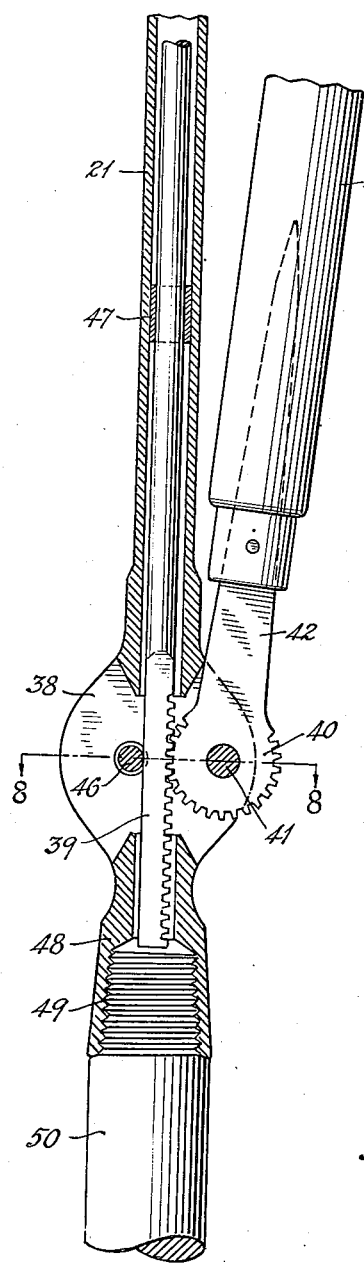
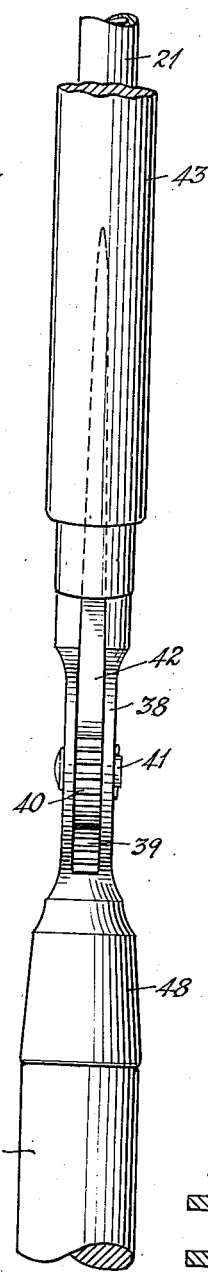
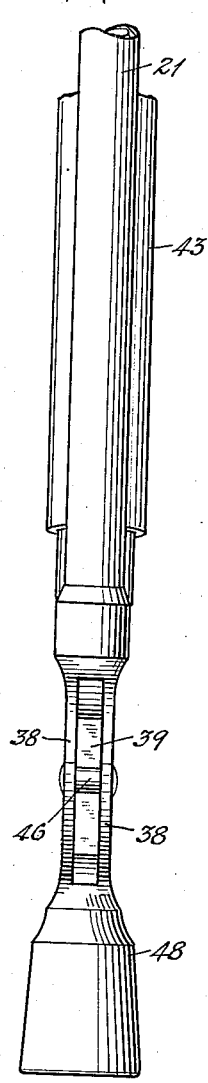
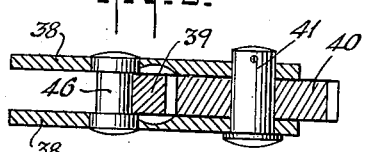
WITNESS
G. V. Rasmussen
INVENTOR
HENRI B. BERNAY
BY
ATTORNEYS

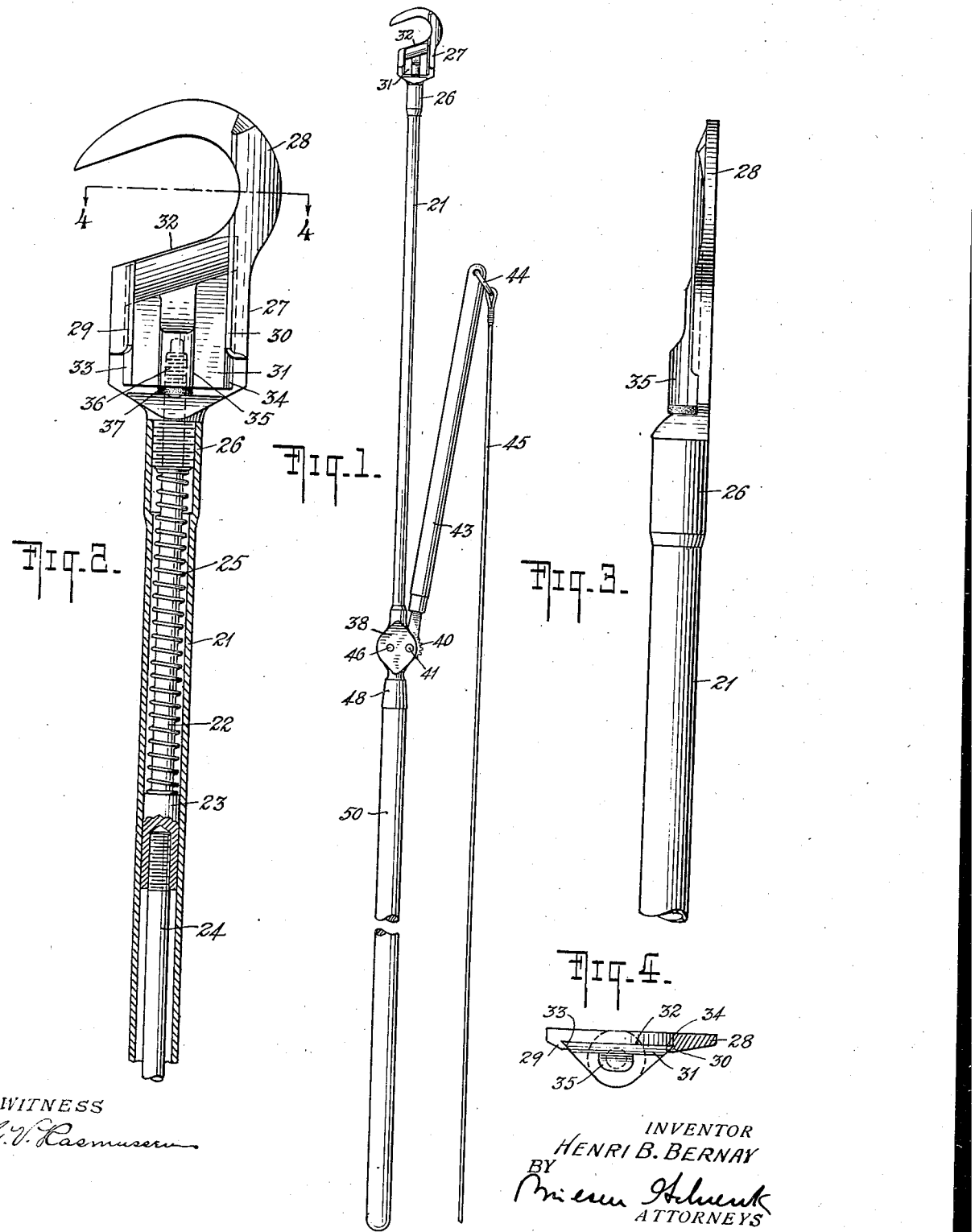

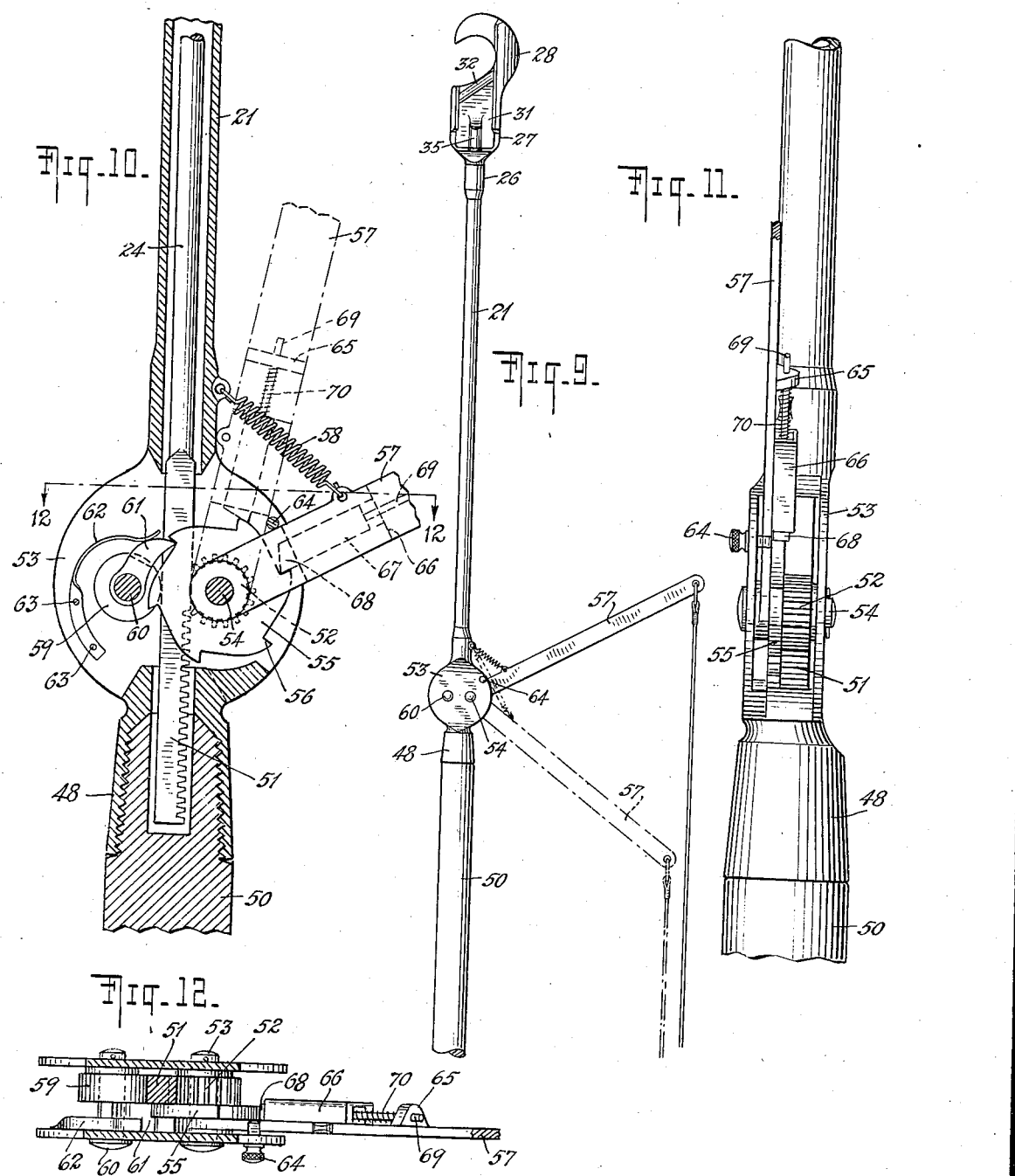

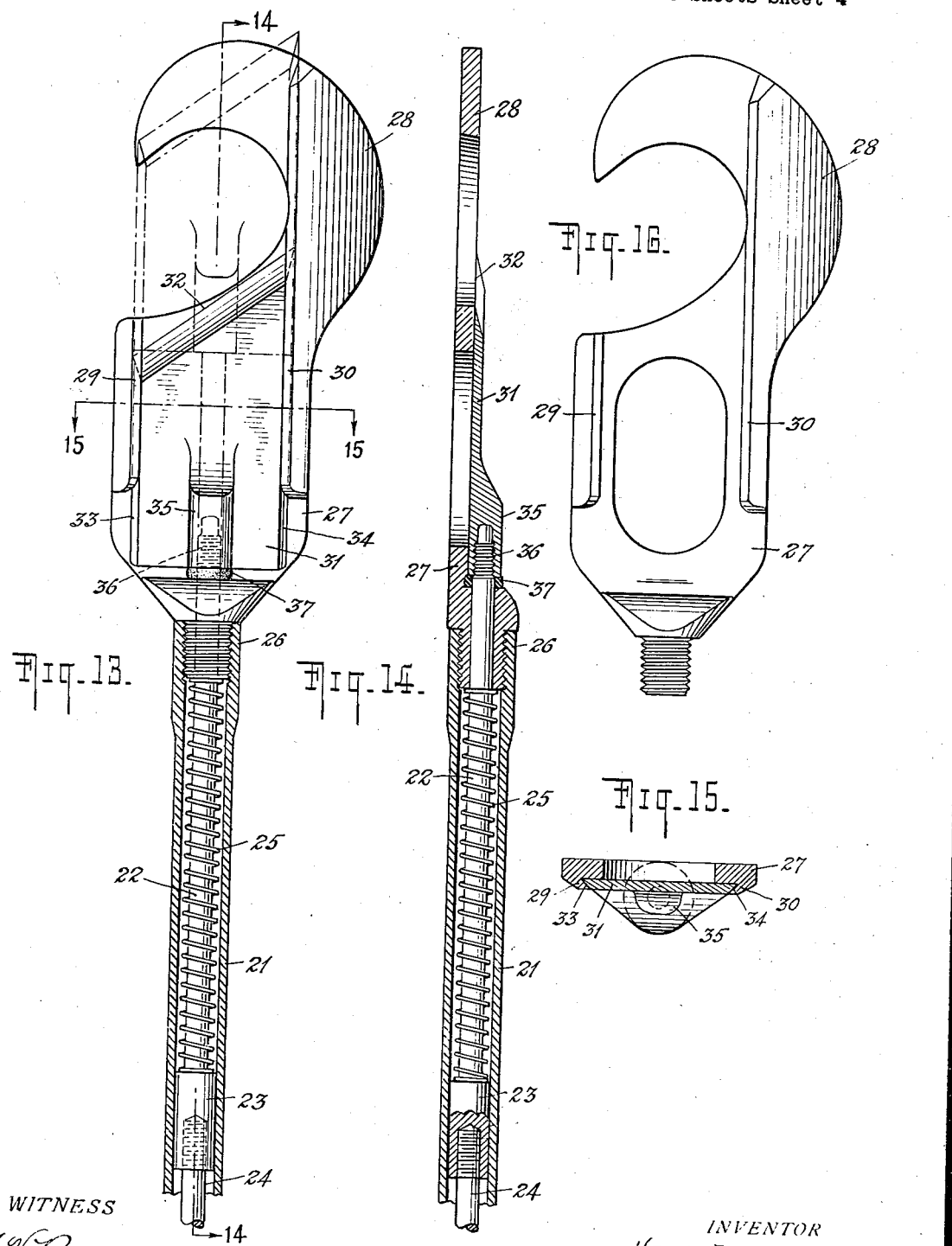

Dec. 26, 1939.  H. B. BERNAY  2,184,332
PRUNING IMPLEMENT
Filed April 27, 1937   5 Sheets-Sheet 5
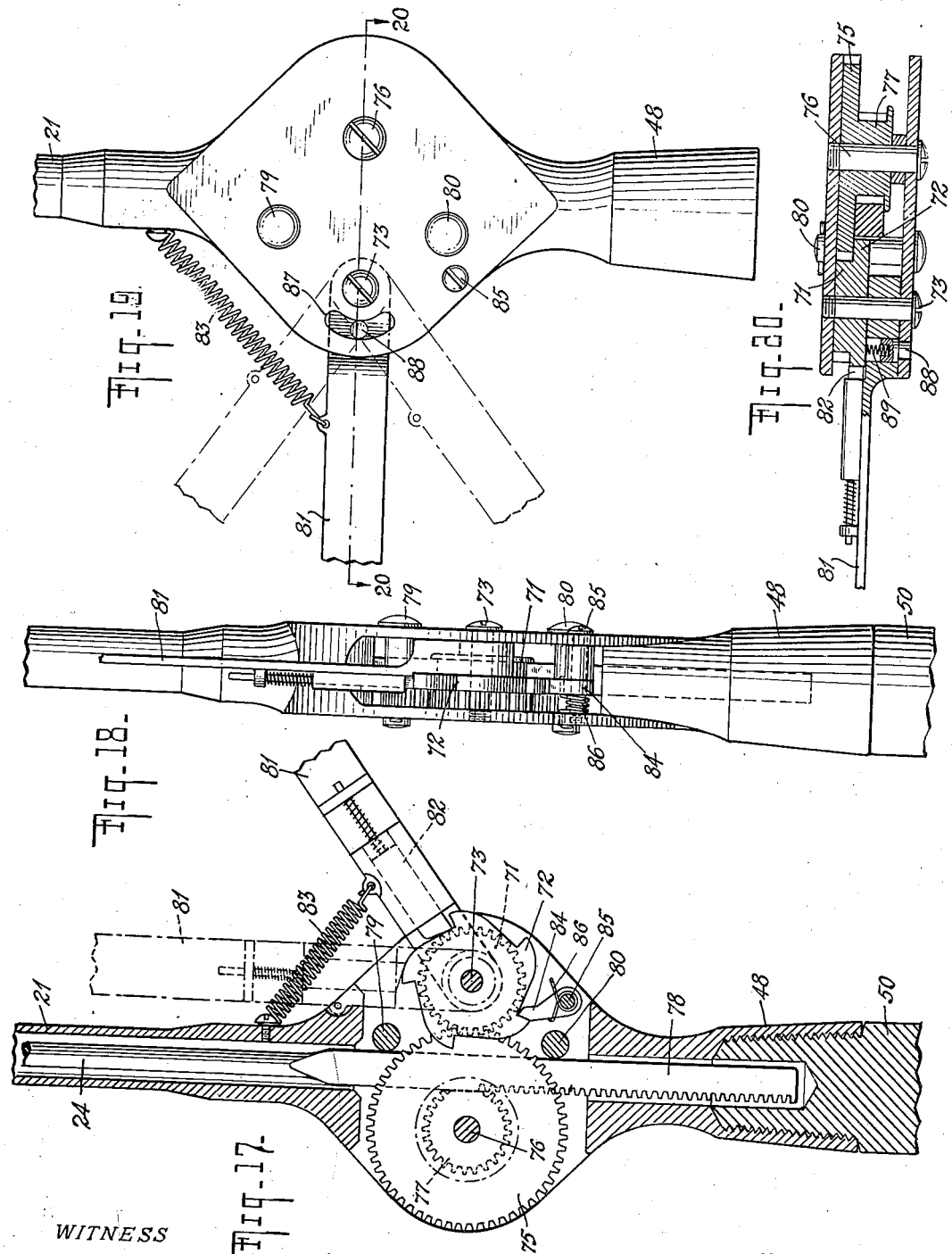
WITNESS
G. V. Rasmussen
INVENTOR
HENRI B. BERNAY
BY
ATTORNEYS

Patented Dec. 26, 1939

2,184,332

UNITED STATES PATENT OFFICE 2,184,332

PRUNING IMPLEMENT

Henri B. Bernay, New York, N. Y.

Application April 27, 1937, Serial No. 139,133

14 Claims. (Cl. 30—243)

The invention relates to an implement for pruning trees or shrubbery and consists more particularly in such an implement which comprises a long metallic tube, a long slender rod enclosed within such tube, a rack and pinion structure, a fixture attached at one end of the tube and terminating in a hooked end and a knife blade slidably mounted in said fixture and attached to the rod.

More particularly the structure of the present invention consists in certain features of construction of the pruning implement which greatly facilitates the operation thereof in such manner as to bring the cutting instrument close to the trunk of the tree, a branch of which is to be severed, so as to have such cutting instrumentality sever the branch with a clean cut close to the trunk.

Among other objects of the invention is to provide a pruning implement having a branch or twig shearing head, including the cutting instrumentality, which may be readily removed from its supporting structure for purposes of replacement or re-grinding of the knife. A further object of the invention is to provide such a structure with a knife operating handle which, when the device has completed its cutting operation or when it is not in use, will be automatically brought to a position substantially parallel to the tube constituting the support for the cutting head, and at the same time cause the knife blade in such cutting head to move to a position where its edge is protected so that the user of the implement cannot be injured by its cutting edge.

In accordance with one embodiment of the invention, the operation of completely severing a branch is accomplished with a single stroke of the operating handle while, in the use of the device constructed in accordance with another embodiment of my invention, for severing branches of comparatively large cross-section, i. e. branches which are thicker or branches of a tree of tougher texture, a greater degree of leverage is provided by my novel structure so that the full movement of the rack bringing the knife blade to its position, where it has completely severed the branch, is accomplished in a plurality of stages, as by successive intermittent upward and downward movements of the operating handle of the implement. In this manner the shearing or severing of the branch is accomplished in easy stages with a minimum of effort necessarily exerted upon the operating handle.

In a still further modified form of my invention, providing a pruning implement for use in severing an extremely heavy type of wood of tough texture or branches of inordinate cross-section, for instance, of a hickory or oak tree, a still further increase in leverage and torque is produced by a system of reduction gearing incorporated in the mechanism for moving the knife blade to its position in which it is effective to sever completely the branch from the tree.

A still further object of the invention is to provide a structure of a pruning implement which is so constructed that one side thereof is completely flush so that it may be placed substantially contiguous tangentially to the trunk of the tree from which a branch is to be severed. This feature is important also in the use of the implement in cutting twigs and smaller branches from larger ones and in what is termed in the art "trimming the tree" by removing dead wood, the presence of which through a blooming season might seriously affect not only the beauty of the tree and its appearance but its very health and life.

A still further object of the invention is to provide such a structure with mechanism which will automatically return the cutting blade back into its position after severing of one branch has been accomplished, so that the implement is ready for use instantaneously upon another branch.

A still further object of the invention is to provide a pruning implement which may have applied thereto any number of sections so as to constitute an elongated support for the cutting head so that ordinarily inaccessible branches in the topmost reaches of a tree may be operated upon. To this end, the handle extending from the support and operative to move the blade into its cutting position is conveniently provided with a cord, chain, or the like, for effecting the operation of the rack and gear mechanism, and the release of which will automatically bring the cutting blade to its protected position and ready for the next pruning operation.

Other features of novelty will appear to those skilled in the art from the following description of particular embodiments of my invention illustrated in the accompanying drawings, in which Figs. 1-8, inclusive, illustrate one form of my novel pruning implement, Figs. 10-16 illustrate a second form of such implement, and Figs. 17-20 illustrate a third embodiment of the invention and more particularly the knife operating mechanism of the implement.

It is to be noted that the embodiment of my invention illustrated in Figs. 1-8 may be effectively used for pruning young trees and small branches; that the second embodiment of my inventive structure, illustrated in Figs. 10-16, is particularly adapted for pruning similar thicker or tougher branches, for instance, those having a diameter of somewhat below two inches; and that the third embodiment of my pruning implement is adapted for use with extremely heavy branches either of very hard wood or of a diameter of say two inches, making it necessary to accomplish the severing operation in successive intermittent slow stages attained by a series of successive movements upwardly and downwardly of the knife operating handle.

In the drawings, Fig. 1 is a front view of the first embodiment of my novel pruning implement; Fig. 2 is an enlarged detail, partly in section, of the upper portion of the implement; Fig. 3 is a side view of such upper portion; Fig. 4 is a section on the line 4—4 of Fig. 2; Fig. 5 is an enlarged detail, partly in section, of the rack and pinion arrangement and adjacent parts; Fig. 6 is a side elevation thereof; Fig. 7 is a side view from the opposite direction; Fig. 8 is a section on the line 8—8 of Fig. 5; Fig. 9 is a front view of the modified form of the pruning implement; Fig. 10 is an enlarged detail, partly in section, similar to Fig. 5, but of the second embodiment; Fig. 11 is a side view of the rack and pinion mechanism shown in Fig. 10; Fig. 12 is a section on the line 12—12 of Fig. 10; Fig. 13 is an enlarged detail of the cutting head and the upper portion of the tube support thereof, partly in section; Fig. 14 is a section on the line 14—14 of Fig. 13; Fig. 15 is a section on the line 15—15 of Fig. 13; Fig. 16 is a face view of the cutting head with the blade removed therefrom; Fig. 17 is an enlarged detail, partly in section, of the blade moving mechanism of the third embodiment of my invention; Fig. 18 is a side view thereof; Fig. 19 is a rear view of the mechanism shown in Fig. 17; and Fig. 20 is a section on the line 20—20 of Fig. 19.

Referring more particularly to the drawings, in which similar reference characters identify similar parts in the several views, and more specifically to Figs. 1-8 thereof, 21 is a metal tube, for instance, of steel or of an aluminum alloy within which is housed a rod 22 having at its lower extremity an apertured threaded sleeve 23 into which is threaded a second rod 24. Any number of such sections, joined by such sleeve structures, may be conveniently provided, so that the operator of the implement stands on the ground, and is not required to climb upon, or among, the branches of the tree. Surrounding the slender rod 22 is a coiled compression spring 25, preferably anchored in the sleeve 23. The tube 21 at its upper end is preferably increased slightly in diameter so as to constitute a receptacle 26, internally threaded for receiving the threaded lower extremity of the cutting head or fixture 27.

Such cutting head or fixture comprises a body, preferably constructed of steel, terminating in a hooked end 28. Such hooked end is preferably constructed to have its nose extend outwardly beyond the edge of the body of the head, so that the implement, in operation, may be brought to a position above the branch to be severed and then dropped so as to have the nose of the hook engage the branch. This construction is preferable as it eliminates the necessity of exactly positioning the hook adjacent a branch and then moving it sidewise to engage the same. The body of the head is provided with a pair of longitudinally extending raceways 29 and 30 within which is slidably mounted the knife 31 having a cutting edge 32 and having its sides suitably bevelled as at 33 and 34 to slide smoothly in the raceways 29 and 30.

The knife or cutting implement 30 has its lower portion thickened at 35, which lower portion is internally threaded at 36 to receive the threaded end of the rod 22. A washer or rubber cushion 37 is provided between the lower thickened portion of the knife and the upper end of the tube 21 to take up the shock of the knife as it returns to its inoperative, protected position as hereinafter described.

The threading 36 of the knife and the correspondingly threaded upper tip of the tube 21 are of the same pitch so that these parts may be screwed together or unscrewed in one operation for facilitating the removal of the knife blade from the fixture for purposes of sharpening or replacement.

The knife blade is made of a specially good tool steel, its cutting edge being disposed at an angle so that the entire blade is guillotine-shaped, whereby an even, smooth, clean severing of the branch is accomplished, produced by an even pressure exerted upon the knife.

It will be noted from an examination of Figs. 3 and 4 that the entire upper rear portion of the pruning implement is flush so that a branch can be reached by the implement at the very base of its connection with the trunk of a tree, or a twig or smaller branch with a larger one, so that such branch or twig can be severed with a clean cut, leaving a substantially smooth surface upon the larger branch or tree trunk.

The lower end of the tube 21 is provided with an oval-shaped bifurcated member 38 between the bifurcated faces of which is supported the rack 39 formed integrally with the rod 24. Meshing with the teeth of the rack 39 are the teeth of a pinion 40 mounted between the bifurcated faces of the member 38 by a pin 41. The pinion 40 is formed integrally with a lever 42 extending therefrom, pointed at its outer end, upon which lever is secured the handle 43. To the upper end of the handle is secured, by a link 44, a cord 45. These several parts, pinion 40, pin 41, lever 42 and link 44, can all be made to constitute a single metal, drop forged unit, the handle in that case being not round as in the case of a wooden handle, but flat, while in place of the link, a hole through the fore end of the lever will serve.

Upon the downward movement of the handle 43, as by a pull upon the cord 45, the pinion 40 is rotated about its pin 41, causing movement of the rack 39 upwardly and thereby operating the knife 31 through the connections constituted by the rods 24 and 21. In order to prevent any play in the upward movement of the rack 39, I provide a roller 46 extending between the bifurcated portions of the member 38 against which roller the back face of the rack 39 is adapted to slide. At appropriate distances along the tube 21, there may be provided internal circular bearings or sleeves 47 guiding the rod 24 in its movement upwardly and downwardly within the tube 21. Such sleeves may be conveniently inserted into the tube 21 by a drive-fit. While the tube 21 may conceivably be made with an internal diameter throughout of the same dimension as the internal diameter of the sleeve shown, the possibility of the parts rusting when the implement has been stored without proper oiling and thereby, when the implement is again used, causing a jamming of the inner rod within the tube, can be prevented by chromium plating the rod 22 and the inner surface of the tube 21.

Depending from the bifurcated member 38 and integral therewith, is a tapered sleeve 48 internally threaded at 49 to receive the threaded extremity of a wooden handle 50 which may be made of one piece or with a plurality of sections. Any other type of connection, for instance, a bayonet joint, or other conventional connection, may be used in place of the tapered sleeve 48. The handle 50 is preferably of wood, so that if the implement is being used in pruning trees in proximity to live electrical wires, the danger of shocks, upon contact of the metal parts of the implement with such wires, will be eliminated.

In the operation of this form of my novel pruning implement, the hooked end of the cutting head is brought over the branch to be severed and the operator pulls down the handle 43, or, in case the branch is in the upper reaches of a tree, the cord 45. The downward movement of the handle 43 which carries the pinion 40, causes the rack 39 on the rod 34, which in turn is operatively connected to the rod 22, to move the knife 31 and its cutting edge 32 upwardly through the branch, completely severing it. When the severing operation has been completed, or when the device is not in use, the interior spring 25 will automatically bring the rack 39 to its lowermost position, and the operating handle 43 to its upper position not completely but nearly parallel to the tube 21. The knife blade will thus be caused to move to a position in which its cutting edge is entirely within the body of the fixture or cutting head so that the edge of the blade is completely protected, eliminating the possibility of the user of the implement or any one handling the same, becoming injured by it.

Turning now to a description of the construction and operation of the second embodiment of my novel pruning implement, illustrated in Figs. 10-16, such pruning implement is designed to operate by a greater leverage as it is to be used for severing thicker or tougher branches than the implement first described. In such second form of my invention the cutting fixture or head is substantially similar to that of the first embodiment.

The knife operating mechanism, as shown in Figs. 10-12 inclusive, comprises a rack 51, the teeth of which are adapted to mesh with those of a pinion 52 which is an interrupted gear, i. e. one having a portion of its peripheral surface not provided with gear teeth. The pinion 52 is mounted within the bifurcated portions of the housing 53 by means of a pin 54. Integral with the pinion 52 is a ratchet wheel 55 having six ratchet teeth 56. The operating handle 57, in this instance, is operatively connected to the integrally formed pinion and ratchet wheel and is urged to its upward position by spring 58.

A roller 59 is mounted upon pin 60 extending between the bifurcated faces of the housing 53. Upon such pin is also mounted a pawl 61 urged by a leaf spring 62 secured to the inner face of one of the bifurcated faces of the housing 53 by rivets 63, 63. The handle 57 is adapted to be held in its position against the tension of the spring 58 by a knurl-headed pin 64 for the reason hereinafter to be described.

Extending from the operating handle 57 are a boss 65 and a housing 66, both of which may be welded or otherwise secured to the handle. These two elements support a latch structure constituted of a bar latch 67 having an angular nose 68 at one end and a rod 69 extending from the other end thereof adapted to pass through the boss 65. Surrounding the rod 69 is a spring 70.

In the operation of this embodiment of my invention, the knife blade is brought into cutting position by a series of successive upward and downward movements of the handle 57 so that the full movement of the rack 51, and therefore of the knife blade, is accomplished by five separate intermittent successive movements of such handle.

Upon each movement downwardly of the handle 57, the pinion 52 turns one-sixth of a complete revolution, moving the rack 51 upwardly. With each such turn of the pinion 52, the ratchet 55, integral therewith, turns one-sixth of a complete revolution thereof and upon completion of a downward movement of the handle one of the ratchet teeth 56 is engaged by the pawl 61, pressed by the spring 62, so as to have the nose of the pawl enter the notch formed by the ratchet. After such movement of the ratchet, as the handle 57 is again brought to its upward position, illustrated in dotted lines in Fig. 10, the angular nose 68 of the latch 67 rides over the face of the ratchet 55 until it passes the tip of the ratchet tooth and is pressed by the spring 70 into the depression beyond such ratchet tooth. The pin 64 prevents the handle 57 from being moved upwardly any distance farther than that necessary to have the spring latch 67 enter the depression immediately following the ratchet tooth. The successive operations of moving the handle 57 downwardly are repeated until the rack 51 has made its full movement upwardly, when the portion of the pinion 52 not provided with teeth will be in contact with the face of the rack. In this position of the parts, the cutting knife has passed entirely through the branch and has effectively severed the same. The sixth successive movement of the handle 57 downwardly, having brought the pinion 52 to the position illustrated in Fig. 10, in which the surface thereof not provided with teeth contacts the rack 51, permits such rack to be automatically returned to its bottommost position, thereby returning the cutting knife to its inoperative, protected position within the cutting head. This return of the rack 51 is effected by the interior spring within the tube 21.

Turning now to the embodiment of my invention constituting the third form thereof, adapted for use in severing very heavy or tough branches, and illustrated in Figs. 17-20 inclusive, such embodiment involves the use of further reduction gearing in the knife operating mechanism.

In such embodiment, the cutting instrumentalities and their supporting structures are identical with those herein described in conjunction with the first and second embodiments. In this case, however, a pinion 71 is formed integrally with a ratchet 72 having five teeth, the integral structure being mounted upon pin 73 extending between the bifurcated faces of the housing 74. The pinion 71 is mounted for engagement with a gear 75, supported upon pin 76, and formed integrally with a smaller, interrupted gear 77. The rack 78 is adapted for movement upwardly and downwardly and has its back face bearing against two loosely mounted pins 79 and 80 so as to guide the same in its vertical movement.

The handle 81 is provided with a spring latch 82 of approximately the same design and same function as that in the second embodiment and is urged towards its upper inoperative position shown in dotted lines in Fig. 17 by the spring 83.

A pawl 84 mounted upon pin 85 and controlled by coil spring 86, functions as a stop in contacting the teeth of the ratchet 72.

For limiting the throw of the lever arm constituting the handle 81 there is provided, in this modification, an arcuate slot 87 formed in one of the bifurcated elements of the housing, into which projects a pin 88 pressed by spring 89. The movement of the pin 88 within the arcuate slot 87 limits the throw of the handle 81. When it is desired to bring the handle 81 to its inoperative position parallel to the body of the implement, the pin 88 is depressed against the tension of the spring 89 so as to permit the movement of the operating handle 81 from its full line position in Fig. 17 to its dotted line position shown in such figure.

The operation of this embodiment of my invention is as follows: The operating handle 81 is given a downward pull resulting in a revolution of the gear 71 and therefore of the ratchet 72 of approximately one-fifth their complete revolutions. This rotation of the gear 71 produces a rotation of the gear 75, with which its teeth are in engagement, and thereby a corresponding rotation of the gear 77, the teeth of which are in engagement with the teeth of the rack 78. After completion of this movement, the pawl 84 will retain the ratchet 72 in its advanced position, whereupon the upward movement of the operating handle 81, through an arc limited by the length of the arcuate slot 87, will bring the spring latch 82 to its position within the depression immediately above the next succeeding tooth of the ratchet 72. Upon a second movement of the handle 81 downwardly, the gear 71 and the ratchet 72 will be moved another fraction of their revolution and through the gears 75 and 77 move the rack 78 upwardly. Upon completion of ten of such successive movements of the operating handle (the ratio of gears 71 and 75 being 2 to 1), the surface of the gear 77 not provided with teeth will be brought opposite the edge of the rack 78 permitting the return thereof by the spring within the cutting implement and therefore the return of the knife blade to its inoperative, protected position within the head.

While I have described specific embodiments of my invention, it will be obvious that various changes in the particular configuration and arrangement of the several parts may be made therefrom without departing from my invention.

I claim:

1. A pruning implement comprising a long metallic tube, a cutting head secured to the upper end of said tube, a knife slidably mounted in said cutting head, a long slender metal rod housed in said tube and secured at its upper end to said knife, means at the lower end of said tube for transmitting upward force through said rod to said knife including a rack provided at the lower end of said rod, a pinion mounted on said tube adjacent the lower end thereof and meshing with said rack, an operating handle connected with said pinion and adapted upon rotative movement thereof away from said cutting head, to rotate said pinion so as to force said slender rod towards said cutting head thereby advancing the knife attached to the upper end of said rod in the cutting head, means for maintaining said rod in its position of alignment axially of the tube during the rotative movement of said handle, and a compression spring surrounding said slender rod within said tube, said spring being interposed between a spring seat attached to the upper end of said tube and a spring seat provided on said rod intermediate said first mentioned spring seat and said rack and adapted to normally maintain said rod and knife in retracted position and to yieldingly resist advancement of the same by said operating handle.

2. A pruning implement comprising a long metallic tube, a cutting head having a tubular lower extremity positioned within and detachably connected to the upper end of said tube, a knife slidably mounted in said cutting head, a long slender metal rod housed in said tube and extending through the tubular extremity of said cutting head, said rod being detachably connected to said knife in such manner that said knife and cutting head can be removed from said rod and tube, respectively, as a unit in a single operation, means at the lower end of said tube for transmitting upward force through said rod to said knife including a rack provided on the lower end of said slender rod, a pinion mounted on said tube adjacent the lower end thereof and meshing with said rack, an operating handle connected with said pinion and adapted upon rotative movement thereof away from said cutting head, to rotate said pinion so as to force said slender rod towards said cutting head thereby advancing the knife attached to the upper end of said rod in the cutting head, means coacting with the tubular extremity of said cutting head to maintain said rod in its position of alignment axially of the tube during the rotative movement of said handle, and a compression spring surrounding said slender rod within said tube, said spring being interposed between a spring seat provided on the tubular extremity of said cutting head and a spring seat provided on said rod intermediate said first mentioned spring seat and said rack and adapted to normally maintain said rod and knife in retracted position and to yieldingly resist advancement of the same by said operating handle.

3. A pruning implement comprising a long metallic tube, a cutting head having a tubular lower extremity in threaded engagement with the inner wall of the upper end of said tube, a knife slidably mounted in said cutting head, a long slender metal rod housed in said tube and extending through the tubular extremity of said cutting head into threaded engagement with said knife, the several threads being arranged to enable the cutting head and knife to be assembled or disassembled as a unit on said tube and rod in a single operation, means at the lower end of said tube for transmitting upward force through said rod to said knife including a rack provided on the lower end of said slender rod, an operating handle mounted on said tube adjacent the lower end thereof, said handle having a segment gear meshing with said rack and adapted upon rotative movement of the handle away from said cutting head to force said slender rods towards said cutting head thereby advancing the knife in the cutting head, a rotatable element engaging the lower end of said rod and coacting with the tubular extremity of the cutting head to maintain said rod in its position of alignment axially of the tube during the rotative movement of the handle, and a compression spring surrounding said slender rod within said tube, said spring being interposed between the tubular extremity of said cutting head and a spring seat provided on said rod intermediate said first mentioned spring seat and said rack and adapted to normally maintain said rod and knife in retracted position and to yieldingly resist advancement of the same by said operating handle.

4. A pruning implement comprising a long metallic tube having means at its lower end for mounting it on the upper end of an elongated pole, a cutting head detachably connected to the upper end of said tube and having a tubular lower extremity positioned within such upper end of the tube, the body portion of said cutting head being offset from said tubular extremity so that the rear surfaces thereof are substantially flush with and in line with a plane tangential to said tube and parallel to such rear surfaces, a knife slidably mounted in said cutting head, a slender rod housed in said tube and extending through the tubular extremity of said cutting head and secured at its upper end to said knife, means at the lower end of said tube for transmitting upward force through said rod to said knife including a rack provided at the lower end of said rod, a pinion mounted on said tube adjacent the lower end thereof and meshing with said rack, an operating handle connected with said pinion and adapted upon rotative movement thereof away from said cutting head, to rotate said pinion so as to force said slender rod towards said cutting head thereby advancing the knife in such head, means coacting with the tubular extremity of said cutting head and said pinion to maintain said rod in its position of alignment during the rotative movement of said handle, and a compression spring surrounding said slender rod within said tube, said spring being interposed between the tubular extremity of said cutting head and a spring seat provided on said rod and adapted to maintain said rod and knife in retracted position and to yieldingly resist advancement of the same by said operating handle.

5. A pruning implement as claimed in claim 1, including a ratchet wheel integral with the pinion, the operating handle having a latch mechanism for engaging the teeth of the ratchet wheel successively upon successive intermittent upward movements of the operating handle, whereby said pinion and ratchet wheel are rotated in successive stages upon successive movements of the operating handle downwardly.

6. A pruning implement as claimed in claim 1, including a ratchet wheel integral with the pinion and in which the pinion has a portion of its peripheral surface not provided with teeth, the operating handle having a latch mechanism for engaging the teeth of the ratchet wheel successively upon successive intermittent upward movements of the operating handle, said pinion and ratchet wheel being adapted for rotation in successive stages upon successive movements of the operating handle downwardly, and in which, when the face of said pinion not provided with teeth is brought opposite the edge of said rack, the rack will be returned by the action of the spring surrounding the slender rod to its bottommost position.

7. A pruning implement as claimed in claim 1, including a ratchet wheel integral with the pinion and in which the pinion has a portion of its peripheral surface not provided with teeth, a pawl for retarding reverse rotation of said ratchet wheel, a latch mechanism in said handle for engaging the teeth of the ratchet wheel successively upon successive intermittent upward movement of the operating handle, said pinion and ratchet wheel being adapted for rotation in successive stages upon successive movements of the operating handle downwardly, and in which, when the face of said pinion not provided with teeth is brought opposite the edge of said rack, the rack will be returned by the action of the spring surrounding the slender rod to its bottommost position.

8. A pruning implement as claimed in claim 1, including a housing, a ratchet wheel integral with the pinion within said housing, a latch mechanism in the operating handle for engaging the teeth of the ratchet wheel successively upon successive intermittent upward movements of the handle, said pinion and ratchet wheel being rotatable in successive stages upon successive movements of the operating handle downwardly, a spring-pressed pawl preventing reverse rotation of the ratchet wheel upon completion of each successive movement in its revolution, and a pin extending inwardly from the inner face of said housing, limiting the upward movement of the operating handle.

9. A pruning implement as claimed in claim 1, including a bifurcated housing, a ratchet wheel integral with the pinion, within said housing, the pinion having a portion of its peripheral surface not provided with teeth, a latch mechanism in said handle for engaging the teeth of the ratchet wheel successively upon successive intermittent upward movements of the operating handle, said pinion and ratchet wheel being rotatable in successive stages upon successive movements of the operating handle downwardly, a spring-pressed pawl for retarding the ratchet wheel upon each successive movement in its revolution, a pin extending inwardly from the inner face of one of the bifurcated faces of the rack and pinion housing limiting the upward movement of the operating handle, whereby when the face of said pinion not provided with teeth is brought opposite the edge of said rack, the rack will be returned by the action of the spring surrounding the slender rod to its bottommost position.

10. In a pruning implement, the combination of a metallic tube, a cutting head at the end thereof, a rod housed within said tube, a knife slidably mounted in said head and attached to one end of said rod, actuating means operatively connected with the other end of said rod for causing movement of said knife slidably within said cutting head in successive intermittent movements for effecting severing of a branch in a plurality of shearing stages, a compression spring surrounding said rod within said tube, said spring being arranged with relation to said rod and tube so as to yieldingly resist the successive intermittent movements of said knife and to cause said blade to be returned to retracted position within the head, and means for rendering said actuating means inoperative to cause further movement of said knife after the branch has been severed and to enable said spring to return said knife to its retracted position.

11. In a pruning implement, the combination of a metallic tube, a cutting head at the end thereof, a rod housed within said tube, a knife slidably mounted in said head and attached to one end of said rod, actuating means for causing movement of said knife slidably within said cutting head in successive intermittent movements for effecting severing of a branch in a plurality of shearing stages, said means comprising a rack connected with said rod, a pinion, a ratchet wheel connected with said pinion and an operating handle carrying latch mechanism adapted to engage the teeth of said ratchet, a compression spring surrounding said rod within said tube, said spring being arranged with relation to said rod and tube so as to yieldingly resist the successive intermittent movements of said knife and to cause said knife to be returned to retracted position within the head, and means for rendering said actuating means inoperative to cause further movement of said knife after the branch has been severed and to enable said spring to return said knife to its retracted position.

12. A pruning implement as claimed in claim 10, in which the means for causing the operative sliding movement of the knife includes a rack connected to the rod, a pinion, a ratchet wheel fixedly connected to and rotatable with said pinion, a gear in meshing engagement with said pinion and a second gear fixedly connected to and rotatable with said first-mentioned gear, and in which said second gear has a portion of its periphery not provided with teeth whereby, when such surface of said gear comes opposite to the face of said rack, said rack will be returned by the spring surrounding the rod to its lowermost position.

13. In a pruning implement as claimed in claim 11, a pair of rollers secured by pins at one side along the edge of said rack opposite from that provided with teeth, whereby the vertical movement of said rack is controlled so as to be in exact axial alignment with the tube.

14. In a pruning implement as claimed in claim 11, a bifurcated member housing the rack and pinion structure, having in one element thereof an arcuate slot and a pin extending from the side of the operating handle for movement within said slot, whereby the throw of the arm of said operating handle is limited.

HENRI B. BERNAY.